United States Patent
Fredankey, Sr.

(10) Patent No.: US 10,674,833 B2
(45) Date of Patent: Jun. 9, 2020

(54) ADJUSTABLE HIGHCHAIR ASSEMBLY

(71) Applicant: Devon Fredankey, Sr., Brooklyn, NY (US)

(72) Inventor: Devon Fredankey, Sr., Brooklyn, NY (US)

( * ) Notice: Subject to any disclaimer, the term of this patent is extended or adjusted under 35 U.S.C. 154(b) by 89 days.

(21) Appl. No.: 15/895,141

(22) Filed: Feb. 13, 2018

(65) Prior Publication Data

US 2019/0246809 A1 Aug. 15, 2019

(51) Int. Cl.
*A47D 1/00* (2006.01)
*A47D 1/10* (2006.01)
*B60B 3/00* (2006.01)
*B60B 33/00* (2006.01)
*B60T 1/04* (2006.01)

(52) U.S. Cl.
CPC ............ *A47D 1/006* (2013.01); *A47D 1/004* (2013.01); *A47D 1/10* (2013.01); *B60B 3/001* (2013.01); *B60B 33/0094* (2013.01); *B60T 1/04* (2013.01); *A47D 1/0085* (2017.05); *B60B 33/0078* (2013.01); *B60B 2200/22* (2013.01)

(58) Field of Classification Search
CPC ....... A47D 1/006; A47C 7/024; A47C 11/005; A47B 83/02; B60N 2205/35
USPC ................ 297/451.4, 451.5, 232; 108/157.1
See application file for complete search history.

(56) References Cited

U.S. PATENT DOCUMENTS

| | | | | |
|---|---|---|---|---|
| 3,223,431 A * | 12/1965 | Gottfried | ................. | B62B 7/14 280/47.38 |
| 4,718,717 A | 1/1988 | Cruz | | |
| 5,033,761 A * | 7/1991 | Kelly | ........................ | B62B 7/04 280/47.38 |
| 5,564,778 A * | 10/1996 | Shimer | .................... | A47D 1/00 292/8 |
| 6,070,936 A * | 6/2000 | Holland | .................... | A47C 1/12 297/232 |
| 6,250,653 B1 | 6/2001 | Worrell | | |
| 6,345,864 B1 * | 2/2002 | Rivera | .................... | A47D 11/00 297/130 |
| 7,344,193 B1 | 3/2008 | Carrier et al. | | |
| 7,407,226 B2 * | 8/2008 | Macliver | ............... | B60N 2/2806 297/216.11 |
| 7,434,877 B2 * | 10/2008 | Herold, III | ............. | B60N 2/015 297/232 |
| 8,240,762 B2 * | 8/2012 | Herzberg | ................. | B60N 2/01 297/239 |
| 8,398,143 B1 * | 3/2013 | Haley | ....................... | B62B 7/00 296/65.06 |
| 9,440,669 B2 * | 9/2016 | Poslowski | ............... | B62B 7/008 |
| 2004/0212231 A1 * | 10/2004 | Dickinson | ................ | A47D 1/00 297/250.1 |

(Continued)

FOREIGN PATENT DOCUMENTS

GB 2465987 A * 6/2010 ............. A47D 1/008

*Primary Examiner* — David R Dunn
*Assistant Examiner* — Tania Abraham
(74) *Attorney, Agent, or Firm* — Boudwin Intellectual Property; Daniel Boudwin

(57) ABSTRACT

An adjustable highchair. The adjustable highchair includes attachments for seating multiple children simultaneously for convenience when seating multiple children for feeding or other activities. An interchangeable chair assembly is attachable to a height adjustable stem. Each chair assembly includes one or more seats that support a child.

20 Claims, 4 Drawing Sheets

(56) References Cited

U.S. PATENT DOCUMENTS

2007/0108812 A1    5/2007  Haun et al.
2011/0309658 A1*  12/2011  Carimati Di Carimate ................
                                                       A47D 1/008
                                                          297/68

* cited by examiner

ADJUSTABLE HIGHCHAIR ASSEMBLY

BACKGROUND OF THE INVENTION

The present invention relates to elevated seating and eating devices for children. More specifically, the present invention provides a wheeled base having an adjustable stem adapted to receive different chair assemblies having two or more seating stations.

Children are often too small to eat on adult sized dining furniture because the large chairs and table can make it difficult for the children to reach the items they need to eat. Although highchairs are typically employed to remedy this issue, existing highchairs are large and cumbersome when being utilized. For instance, in order to remove them or change their direction they usually need to be dragged or lifted. Further, traditional highchairs are not designed to accommodate multiple children or growing children, making it hard for multiple child homes and daycare centers to tend to each child appropriately.

In light of the devices disclosed in the known art, it is submitted that the present invention substantially diverges in design elements from the known art and consequently it is clear that there is a need in the art for an improvement to existing devices for safely seating multiple children. In this regard, the instant invention substantially fulfills these needs.

SUMMARY OF THE INVENTION

In view of the foregoing disadvantages inherent in the known types of highchairs now present in the prior art, the present invention provides an adjustable highchair having attachments for seating multiple children wherein the same can be utilized for providing convenience for the user when seating multiple children for feeding or other activities.

It is therefore an object of the present invention to provide a new adjustable highchair assembly for seating multiple children that has all the advantages of the prior art and none of the disadvantages.

It is another object of the present invention to provide an adjustable highchair assembly comprising a movable base having a plurality of wheels disposed on a bottom surface thereof, an adjustable stem having a first end extending outward from a top surface of the movable base, and a chair attachment having two or more seating areas removably securable to a second end of the adjustable stem.

Another object of the present invention is to provide an adjustable highchair assembly wherein the plurality of wheels disposed on the bottom of the base are independently movable and have a braking system.

It is another object of the present invention to provide an adjustable highchair assembly wherein the adjustable stem utilizes a pneumatically telescopic pole.

It is another object of the present invention to provide an adjustable highchair assembly wherein the chair attachments provide straps that removably secure a child in the seating area as well as eating trays removably securable to the seating area.

Other objects, features and advantages of the present invention will become apparent from the following detailed description taken in conjunction with the accompanying drawings.

BRIEF DESCRIPTION OF THE DRAWINGS

Although the characteristic features of this invention will be particularly pointed out in the claims, the invention itself and manner in which it may be made and used may be better understood after a review of the following description, taken in connection with the accompanying drawings wherein like numeral annotations are provided throughout.

DETAILED DESCRIPTION OF THE INVENTION

Figure 1A:
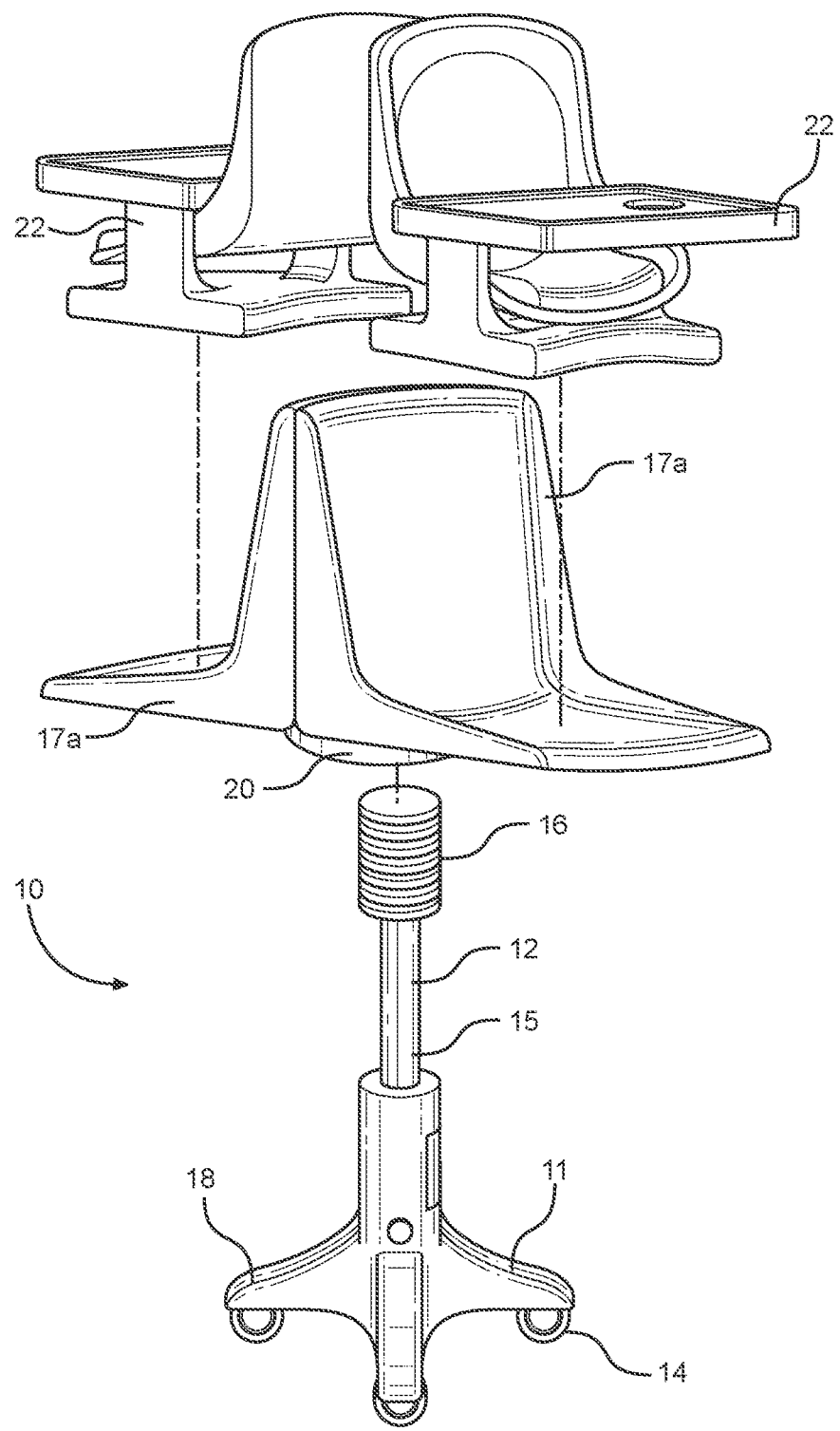
FIG. 1A shows an exploded view of one embodiment of the adjustable highchair assembly.

Reference is made herein to the attached drawings. Like reference numerals are used throughout the drawings to depict like or similar elements of the adjustable highchair assembly. The figures are intended for representative purposes only and should not be considered to be limiting in any respect.

Figure 1B:
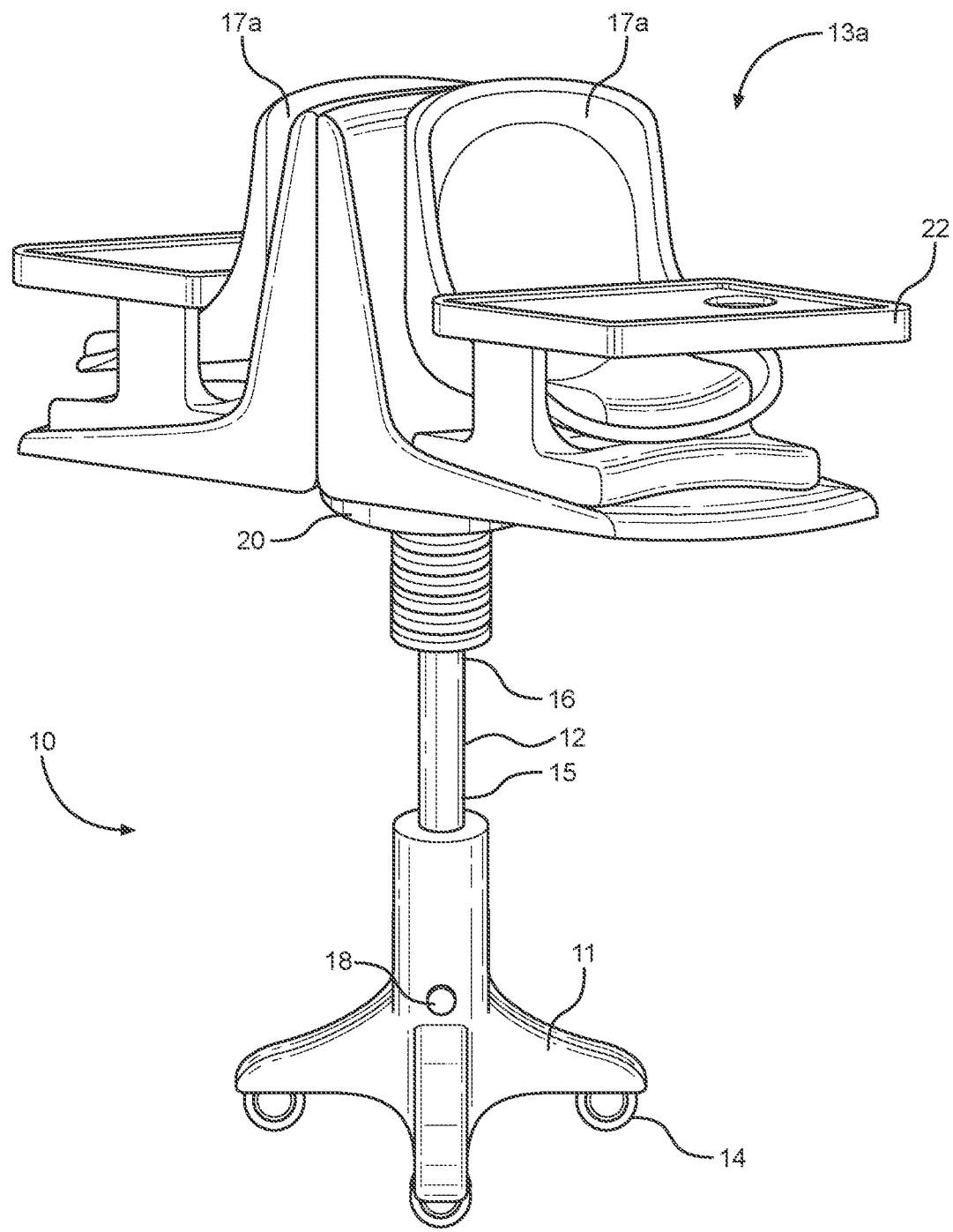
FIG. 1B shows a perspective view of one embodiment of the adjustable highchair assembly.

Referring now to FIGS. 1A and 1B, there is shown an exploded view and a perspective view of one embodiment of the adjustable highchair assembly, respectively. The adjustable highchair assembly 10 provides highchair seating for multiple users, such as children. The adjustable highchair assembly 10 comprises a chair assembly 13a removably affixed to a stem 12 at a first end 16. A base 11 is removably affixed to the stem 12 at a second end 15, such that the base 11 is configured to position the adjustable highchair assembly 10 in an upright orientation when supported on a level surface. The chair assembly 13a includes one or more seats 17a, wherein each seat 17a is adapted to support a user thereon. The stem 12 includes a cylindrical member that is height adjustable, thereby allowing for selective positioning of the chair assembly 17a. In one embodiment, the stem 12 is height adjustable via pneumatic system.

In the shown embodiment, the chair assembly 13a includes a pair of opposing facing seats 17a that extend radially from the stem 12, forming a back-to-back configuration. The chair assembly 13a is selectively rotatable about the stem 12, and each seat 17a extends radially from the stem 12. Each of the seats 17a is fixed to a plate 20 that join the seats 17a, preventing relative movement thereof. In this way, each seated user has equal space on either side of the user's respective seat.

The base 11 further comprises a wheel 14 disposed on a bottom side thereof. The wheel 14 provides for rolling movement of the adjustable highchair assembly 10. In the shown embodiment, the wheel 14 includes a plurality of wheels disposed at a perimeter of the base 11, wherein each wheel 14 is independently movable from each other wheel. A braking system is operably connected to at least one of the wheels 14. The braking system includes a locking mechanism 18 that is configured for selective actuation for engaging with the wheel 14 to permit or restrict movement thereof. In the illustrated embodiment, the locking mechanism 18 includes a pin adapted to be depressed to frictionally engage with the one or more wheels 14.

A chair attachment 22 is removably affixed to a corresponding seat 17a of the chair assembly 13a, wherein the chair attachment 22 is adapted to support children thereon. In the shown embodiment, the chair attachment 22 includes a tray integral therewith. In one embodiment, an interior side of the chair attachment 22 includes padding.

Figure 2:
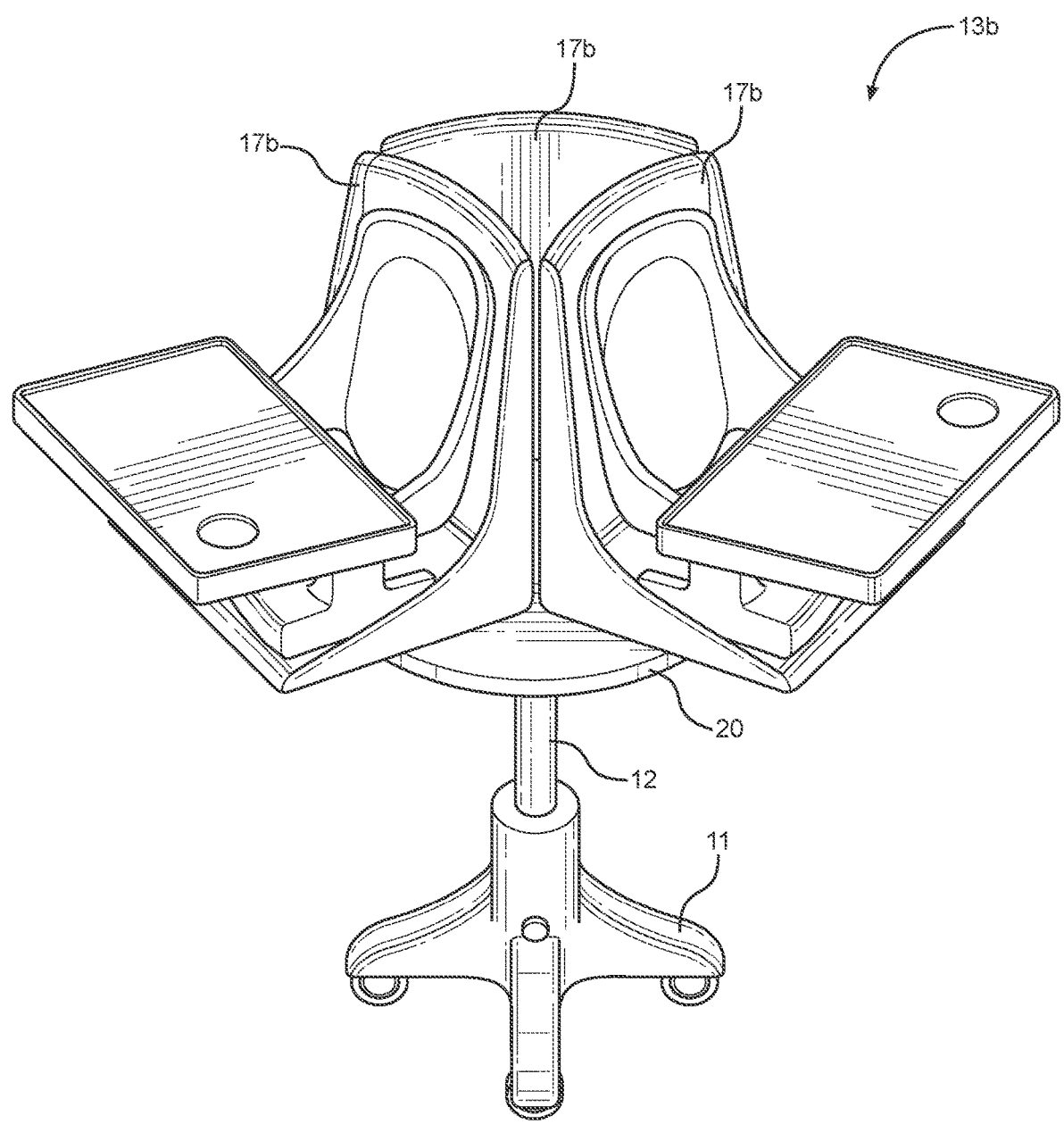
FIG. 2 shows a perspective view of a second embodiment of the adjustable highchair assembly.
Figure 3:
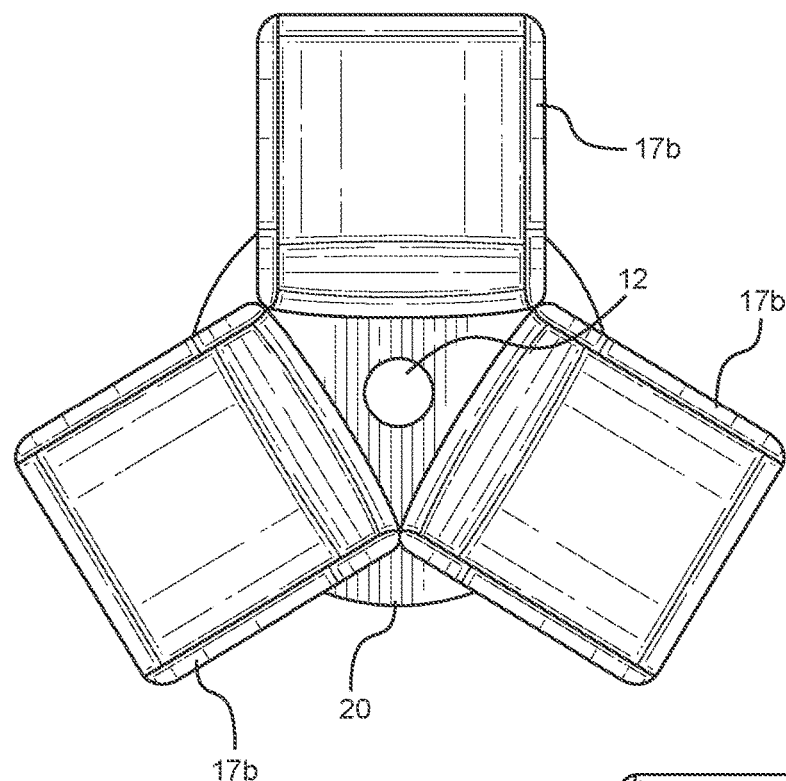
FIG. 3 shows an overhead view of the second embodiment of the adjustable highchair assembly.

Referring now to FIGS. 2 and 3, there is shown a perspective view and an overhead view of a second embodiment of the adjustable highchair assembly, respectfully. In the shown second embodiment, the chair assembly 13b includes three seats 17b arranged in a triangular configuration, such that each seat 17b extends radially from the stem 12. Each of the seats 17b form an angle between adjacent seats, wherein each angle is equiangular to provide balance when users are seated thereon. The chair assembly is interchangeable with the alternative embodiment chair assemblies 13a, 13b.

The chair assembly 13b includes a plate 20 that supports each of the seats 17b thereon, and removably affixes the chair assembly 13b to the first end 16 of the stem 12. In one embodiment, the first end 16 comprises a spring-loaded ball detent joint. The plate 20 allows for the seats 17b to have a generally upright back rest portion, while remaining rotatable about the stem 12. The plate 20 and upright back rest portions form an empty interior volume. The plate 20 allows for positioning of each seat 17b at a distance offset from the stem 12, while remaining fixed to each of the other seats 17b. In this way, the adjustable highchair assembly allows for multiple seats to be disposed therearound.

Figure 4:
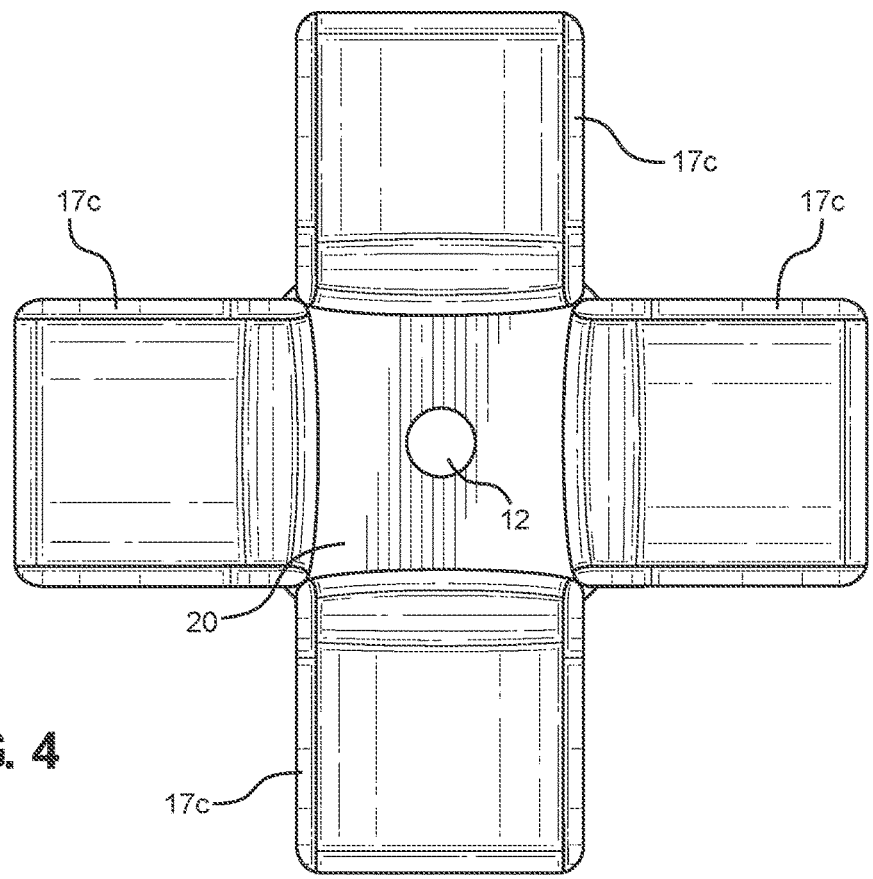
FIG. 4 shows an overhead view of a third embodiment of the adjustable highchair assembly.

Referring now to FIG. 4, there is shown an overhead view of a third embodiment of the adjustable highchair assembly. In the shown third embodiment, the chair assembly includes four seats 17c arranged in a square configuration. In one use, a first chair assembly 13a is disengaged and removed from the stem 12. A second chair assembly is interchanged therewith, so as to support more users thereon.

It is therefore submitted that the instant invention has been shown and described in various embodiments. It is recognized, however, that departures may be made within the scope of the invention and that obvious modifications will occur to a person skilled in the art. With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. An adjustable highchair assembly comprising:
a chair assembly removably affixed to a stem at a first end, the chair assembly comprising one or more seats, wherein each seat is configured to support a user thereon;
a base removably affixed to the stem at a second end, the base configured to position the adjustable highchair assembly in an upright orientation on a level surface;
the base comprising a wheel disposed on a bottom side thereof;
the chair assembly rotatable about the stem;
wherein each seat extends radially from the stem;
wherein the chair assembly includes three seats arranged in a triangular configuration.

2. The adjustable highchair assembly of claim 1, wherein the wheel includes a plurality of wheels, each wheel independently movable.

3. The adjustable highchair assembly of claim 1, wherein the wheel includes a braking system, the braking system comprising a locking mechanism for engaging with the wheel to restrict movement thereof.

4. The adjustable highchair assembly of claim 1, wherein the stem is height adjustable via a pneumatic system.

5. The adjustable highchair assembly of claim 1, wherein the chair assembly is axially rotatable about the stem.

6. The adjustable highchair assembly of claim 1, wherein the chair assembly removably secures to the stem via a spring-loaded ball detent joint.

7. The adjustable highchair assembly of claim 1, wherein each seat is disposed equidistant to an adjacent seat.

8. The adjustable highchair assembly of claim 1, wherein a chair attachment removably secures one of the seats of the chair assembly.

9. The adjustable highchair assembly of claim 8, wherein the chair attachment includes a strap configured to removably secure a user within each of the one or more seats.

10. The adjustable highchair assembly of claim 8, wherein the chair attachment includes a removably securable tray.

11. The adjustable highchair assembly of claim 1, wherein the chair assembly is interchangeable with a chair assembly having a differing number of seats.

12. An adjustable highchair assembly comprising:
a chair assembly removably affixed to a stem at a first end, the chair assembly comprising one or more seats, wherein each seat is configured to support a user thereon;
a base removably affixed to the stem at a second end, the base configured to position the adjustable highchair assembly in an upright orientation on a level surface;
the base comprising a wheel disposed on a bottom side thereof;
the chair assembly rotatable about the stem;
wherein each seat extends radially from the stem;
wherein the chair assembly includes four seats arranged in a square configuration.

13. The adjustable highchair assembly of claim 12, wherein the wheel includes a plurality of wheels, each wheel independently movable.

14. The adjustable highchair assembly of claim 12, wherein the wheel includes a braking system, the braking system comprising a locking mechanism for engaging with the wheel to restrict movement thereof.

15. The adjustable highchair assembly of claim 12, wherein the stem is height adjustable via a pneumatic system.

16. The adjustable highchair assembly of claim 12, wherein the chair assembly is axially rotatable about the stem.

17. The adjustable highchair assembly of claim 12, wherein the chair assembly removably secures to the stem via a spring-loaded ball detent joint.

18. The adjustable highchair assembly of claim 12, wherein each seat is disposed equidistant to an adjacent seat.

19. The adjustable highchair assembly of claim 12, wherein a chair attachment removably secures one of the seats of the chair assembly.

20. The adjustable highchair assembly of claim 12, wherein the chair assembly is interchangeable with a chair assembly having a differing number of seats.

* * * * *